United States Patent [19]
Zarzalis et al.

[11] Patent Number: 5,765,376
[45] Date of Patent: Jun. 16, 1998

[54] GAS TURBINE ENGINE FLAME TUBE COOLING SYSTEM AND INTEGRAL SWIRLER ARRANGEMENT

[75] Inventors: Nikolaos Zarzalis, Dachau; Günter Meikis, Karlsfeld, both of Germany

[73] Assignee: MTU Motoren- und Turbinen-Union Muenchen GmbH, Munich, Germany

[21] Appl. No.: 570,776

[22] Filed: Dec. 12, 1995

[30] Foreign Application Priority Data

Dec. 16, 1994 [DE] Germany ............... 44 44 961.5

[51] Int. Cl.$^6$ ............................................. F23R 3/60
[52] U.S. Cl. ............................ 60/748; 60/752; 60/756
[58] Field of Search .................... 60/737, 748, 750, 60/752, 756, 754, 747

[56] References Cited

U.S. PATENT DOCUMENTS

| | | | |
|---|---|---|---|
| 3,570,242 | 3/1971 | Leonardi et al. | 60/737 |
| 3,648,457 | 3/1972 | Bobo | 60/39.74 |
| 3,831,854 | 8/1974 | Sato et al. | 60/748 |
| 3,916,619 | 11/1975 | Masai et al. | 60/39.65 |
| 3,946,552 | 3/1976 | Weinstein et al. | 60/748 |
| 4,023,351 | 5/1977 | Beyler et al. | 60/748 |
| 4,162,611 | 7/1979 | Caruel et al. | 60/748 |
| 4,236,378 | 12/1980 | Vogt | 60/757 |
| 4,343,148 | 8/1982 | Shekleton | 60/748 |
| 4,365,951 | 12/1982 | Alpkvist | 60/737 |
| 4,606,190 | 8/1986 | Greene et al. | 60/748 |
| 4,686,823 | 8/1987 | Coburn et al. | 60/752 |
| 4,689,961 | 9/1987 | Stratton | 60/748 |
| 4,751,962 | 6/1988 | Havekost et al. | 60/754 |
| 4,773,596 | 9/1988 | Wright et al. | 60/748 |
| 4,870,818 | 10/1989 | Suliga | 60/756 |
| 5,117,637 | 6/1992 | Howell et al. | 60/748 |
| 5,129,231 | 7/1992 | Becker et al. | 60/754 |
| 5,253,471 | 10/1993 | Richardson | 60/754 |
| 5,331,817 | 7/1994 | Sandelis | 60/747 |
| 5,357,743 | 10/1994 | Zarzalis et al. | 60/748 |
| 5,373,693 | 12/1994 | Zarlalis et al. | 60/748 |
| 5,623,827 | 4/1997 | Monty | 60/748 |

FOREIGN PATENT DOCUMENTS

| | | | |
|---|---|---|---|
| 994115 | 8/1976 | Canada | 60/756 |
| 3328682A1 | 3/1984 | Germany . | |
| 3815382A1 | 11/1988 | Germany . | |
| 4110507C2 | 10/1992 | Germany . | |

Primary Examiner—Timothy Thorpe
Assistant Examiner—Ted Kim
Attorney, Agent, or Firm—Evenson McKeown Edwards & Lenahan, PLLC

[57] ABSTRACT

A system is provided for cooling especially the backplate of a flame tube of a combustion chamber for gas turbine engines, of the type having at least one burner arranged on the backplate and having a fuel nozzle and at least one swirler arranged coaxially with the fuel nozzle for the supply of combustion air. The backplate is cooled with compressed air diverted from a compressor and ducted to a head end of the combustion chamber. The backplate forms at least one cooling air duct to carry the compressed air supplied for backplate cooling, and the cooling air duct communicates at its outlet end at the burner with the flame tube such that the compressed air issuing from the cooling air duct enters into combustion in the primary zone. At its outlet end the cooling air duct can communicate with the air inlets of at least one swirler.

23 Claims, 3 Drawing Sheets

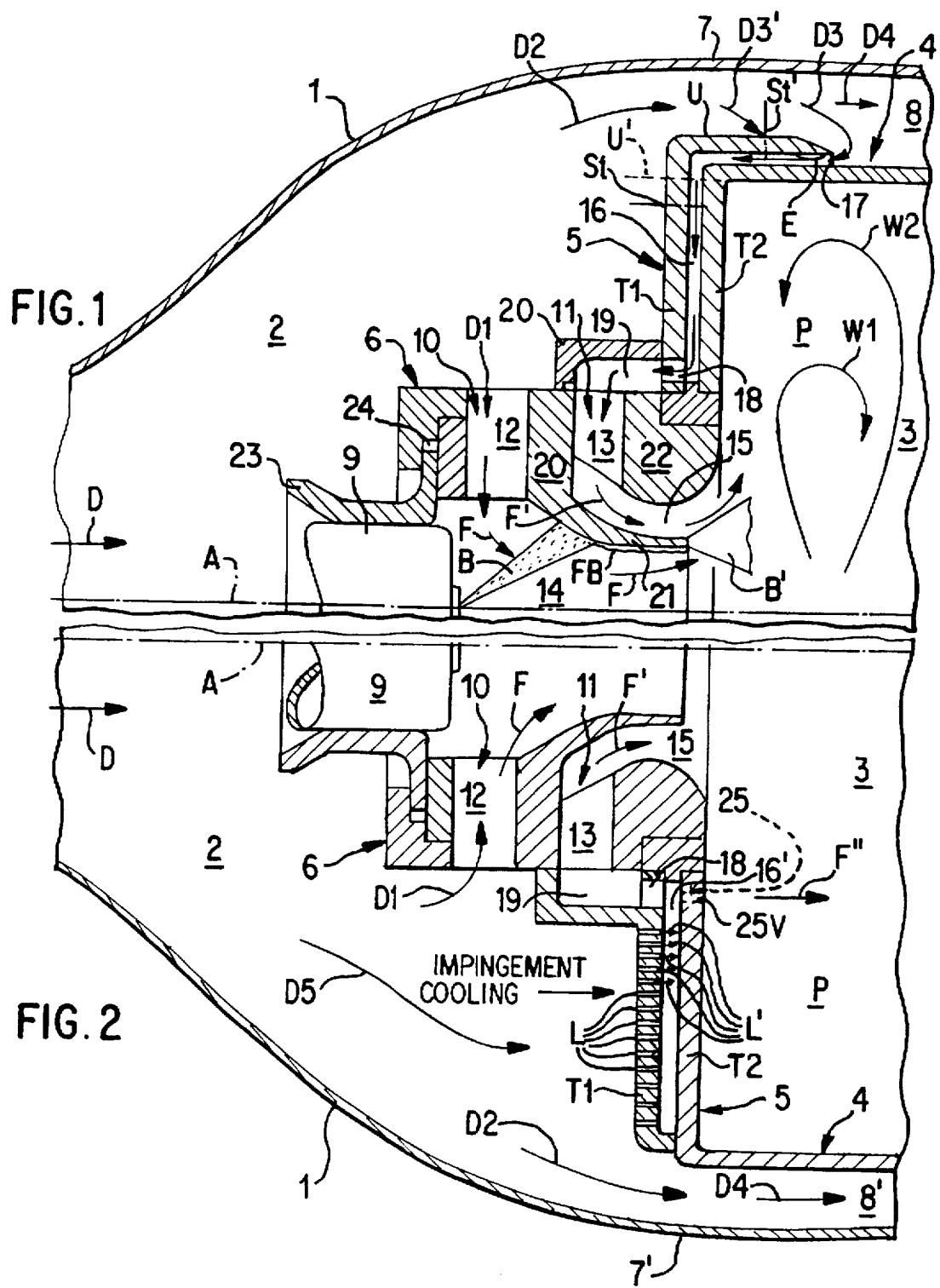

GAS TURBINE ENGINE FLAME TUBE COOLING SYSTEM AND INTEGRAL SWIRLER ARRANGEMENT

BACKGROUND AND SUMMARY OF THE INVENTION

This invention relates to a gas turbine engine flame tube cooling system. More specifically, the present invention relates to a cooling system for a backplate of a flame tube of a combustion chamber for gas turbine engines of the type having at least one burner mounted on the back plate, which burner has a fuel nozzle and at least one combustion or supplying swirler, and wherein the backplate is cooled with compressed air bled from a compressor and ducted to the head end of the combustion chamber.

Previously disclosed advanced burners in accordance with German Patent No. 41 10 507, e.g. FIG. 6, are designed to circumferentially swirl the combustion air relative to the incoming fuel such that vortexes containing uniformly distributed misty and partially evaporating fuel are produced in the combustion chamber's primary zone. Combustion here begins immediately downstream of the flame tube backplate, so that the backplate and burner parts thereon are exposed to extremely high thermal stress. The backplate needs cooling to keep its temperature consistent. To cool the flame tube backplate, use is made of a previously disclosed (German Patent No. 33 28 682) impingement type of cooling. Also disclosed in German Patent No. 3815 382 is an arrangement in which the backplate is a clamshell convection-cooled design, where the upstream member of the backplate has locally distributed ports for the admission of air into the cooling duct between the two wall members. In both of these previously disclosed cases of impingement cooling and convection cooling, respectively, the spent cooling air is admitted into the flame tube in the form of a cooling film continuing downstream along the tube wall. With this efflux location of the cooling air relative to the reaction zone, and depending on the load situation and temperature in the combustion chamber, the spent cooling air is predominantly excluded from combustion or allowed to share in it only partially, so that uniform combustion is prevented. Fuel-air mixtures of locally differing air fractions can be generated from residual portions of incoming fuel and cooling air to join in combustion locally and as they arise. These can produce local thermal peak loads at the combustion chamber head end, i.e. at the backplate, and can moreover cause aggravated emission of pollutants (C, CO, $C_xH_y$).

From these aspects the spent cooling air cannot be utilized such that uniform and stable combustion in the primary zone is achieved already at the flame root. Also, to keep combustion maximally homogenous, it is endeavored to make minimum use of cooling air, the cooling air being obtained from compressed air. Such low cooling air flows are often inadequate for highly effective cooling.

In a broad aspect of the present invention, means for cooling burners of the type described above is provided which enables highly effective cooling of the flame tube backplate and burner parts to be achieved while keeping combustion in the primary zone consistently uniform and stable and avoiding appreciable process losses.

According to preferred embodiments, there is provided a backplate cooling system for a backplate of a flame tube of a combustion chamber for gas turbine engines of the type having at least one burner mounted on the backplate, said burner having a fuel nozzle and at least one swirler arranged coaxially with the fuel nozzle to supply combustion air, where the backplate is cooled with compressed air bled from the compressor and ducted to the combustion chamber at its head end, wherein the backplate forms at least one cooling air duct to carry the compressed air supplied for wall cooling, wherein the cooling air duct communicates at its outlet end at the burner with the flame tube such that compressed air issuing from the cooling air duct enters into combustion in a combustion chamber primary zone already at the flame root.

In accordance with the present invention, relatively large volumes of cooling air can be provided for highly effective cooling. The cooling air flows can largely or fully be adapted to suit the requirement for primary air to be admitted for combustion. The cooling of the flame tube backplate and of the combustion chamber head, respectively, generates practically no inhomogeneities, considering that the spent cooling air is fully and discriminately admitted as process air for primary combustion. The inventive type of regenerative cooling optimizes the combustion process in the interest of uniform, stable combustion. This holds true especially also for two entirely different, selectable types of combustion in the primary zone: one of which is the cool or gentle type of combustion using a fuel-air mixture high in air, where the combustion chamber is operated near the lean flameout limit, while the other is the hot type of combustion in a rich primary zone using a fuel-air mixture high in fuel but low in air for primary combustion.

On the one hand, preferred embodiments of the invention provide improved burner or nozzle stability at a reduced risk of flame extinction, e.g., in that the compressed air, having picked up heat from its wall cooling duty, fosters the necessary high combustion temperature already at the flame root (upstream of the burner exit or at the backplate).

On the other hand, preferred embodiments of the invention provide for comparatively high combustion temperatures to be likewise managed without difficulty.

In the application of suitable cooling methods (convection or impingement), uniform temperature distribution can be achieved at the backplate of the flame tube or at the rear head end of the combustion chamber utilizing preferred embodiments of the invention. Locally differing heat loads and distributions at the backplate, as resulting from combustion, can be compensated for by locally adapted duct structures and profiles, aerodynamic baffles or pimples or webs on or within the cooling air duct to locally increase the heat transfer in the interest of a uniform, reduced wall temperature. In the instance of impingement cooling, locally differing heat loads at the backplate can be controlled with the aid of circumferentially suitably spaced and numbered impingement cooling holes to achieve a uniform, reduced wall temperature.

In certain preferred embodiments of the invention, at least a first and a second swirler are spaced axially apart with tangential flow ducts of the two swirlers separated by a wall which continues between respective outlet parts of the two swirlers in the shape of a radially axially curved sleeve arranged coaxially with the burner or nozzle centerline. With these preferred embodiments, the following aspects of the invention are provided:

When relatively large volumes of cooling and combustion air are needed, two axially spaced-apart swirlers can essentially be provided with air exiting from the cooling air duct to serve in combustion.

When the cooling air requirement is relatively moderate, e.g. in impingement cooling, the swirler nearest the combustion space, e.g., can exclusively be provided with cooling air from the cooling air duct to serve in combustion, where the burner and "second" swirler parts nearest the combustion chamber can be cooled simultaneously. Through the upstream first swirler, and by suitably controlling the swirl ducts, an additional volume of combustion air ("cool" or "gentle" combustion) or compared therewith, a smaller volume of combustion air approaching zero ("hot" combustion, "rich" primary zone) could be selected as desired.

Swirler-based combustion air control to achieve maximally clean combustion has generically been disclosed (German Patent Nos. 41 10 507, 42 28 816 and 42 28 817) and can be used in one or the other of the three disclosed types as a basis in the implementation of the present invention.

Other objects, advantages and novel features of the present invention will become apparent from the following detailed description of the invention when considered in conjunction with the accompanying drawings.

BRIEF DESCRIPTION OF THE DRAWINGS

FIG. 1 is a longitudinal sectional view of essentially the upper half of a combustion chamber section, with parts broken away for clarity of representation at the inlet and combustion space ends, and illustrates a cooling system for convection cooling the flame tube backplate at the head end of an annular combustion chamber having a burner that includes swirlers and a fuel nozzle, constructed according to a preferred embodiment of the invention;

FIG. 2 is a view of another preferred embodiment of the invention, illustrating essentially the lower half of a combustion chamber section, with parts broken away at the inlet and combustion space ends, having a burner at the head end that includes swirlers and a fuel nozzle, where the cooling system is of the impingement cooling type;

DETAILED DESCRIPTION OF THE DRAWINGS

Figure 4:
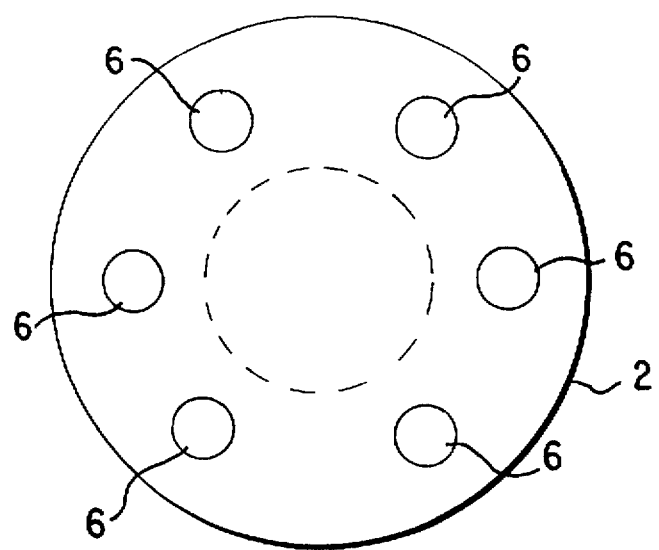
FIG. 4 is a schematic depiction showing a plurality of combustion chamber assemblies around an engine axis.

With reference now to FIGS. 1 and 2 the cooling system is shown at the upstream head end of an annular combustion chamber arranged at a distance from and coaxially with the longitudinal centerline of a gas turbine engine. A nose dome 1 of the combustion chamber at its upstream end surrounds an annulus 2 which is shielded by a backplate 5 of the flame tube 4 and by a fuel burner 6 from a combustion space 3 in the flame tube 4, the downstream end of which flame tube is not shown for clarity of representation. Disposed predominantly within the annulus 2 are—in the annular type of combustion chamber—several such fuel burners 6 in circumferentially equal spacing. The burners are mounted on the annular backplate 5 of the flame tube 4. FIG. 4 schematic depicts a plurality of fuel burners 6 circumferentially equally spaced around the annulus 2.

At approximately the level of the radially outermost portion of the backplate 5, the dome 1 extends into axial wall members 7 (FIG. 1) and 7' (FIG. 2) of the annular combustion chamber outer casing. The axial wall members 7 and 7', together with the flame tube 4, form outer annular ducts 8 and 8', respectively.

Each burner 6 consists of several annular or sleeve-type components and here includes, e.g., two axially spaced-apart annular swirlers 10, 11 arranged coaxially with a common centerline A of the burner 6 and a fuel nozzle 9, which hereinafter will be termed the "first" and "second" swirler 10, 11, respectively. The first and second swirlers 10 and 11 each have ducts 12 or 13 to supply combustion air (in the direction of arrowheads F or F') to the primary zone P of the combustion chamber. The ducts 12 and 13 are arranged in axially offset transverse planes relative to the common burner and nozzle centerline A, in uniform circumferential spacing and tangential disposition. The ducts 12 and 13 are each formed at the annular circumference between wedge-shaped or vane-shaped sections on the annular first and second swirlers 10 and 11, respectively. The first and second swirlers 10 and 11 impress a circumferentially rotating vortex motion on the combustion air, which initially flows into a cylindrical inner duct 14 and an outer annular duct 15 of the burner (arrowheads F and F', respectively). In the primary zone P of the combustion chamber said vortex motions produce—through suitable relative duct arrangement and incidence at the first and second swirlers 10 and 11 co-rotational and contra-rotational fuel-enriched vortexes W1 and W2, respectively, to support combustion.

At the head end the annulus 2 of the combustion chamber is energized with air under pressure D tapped from the gas turbine engine compressor and ducted through an axial diffusor, which is omitted on the drawing. A portion of this compressed air D is routed in the direction of arrowhead D1 to all radially outer air inlet ports of ducts 12 of the first swirler 10 as primary or combustion air. A remaining portion D2 of the incoming compressed air is split into an air flow D3 initially used to cool the backplate 5 and a residual or secondary flow D4 continuing downstream into the outer annular duct 8 or 8' of the combustion chamber. The residual or secondary flow D4 can be routed to the flame tube to serve, e.g., as mixing air or for cooling purposes or for equalizing the temperature profile upstream of the combustion chamber exit.

Between the two wall members T1 and T2, which are axially spaced apart by webs or similar means, the backplate 5 (FIG. 1) forms an, e.g., annular air duct 16. In this arrangement the cooling air duct 16 begins at a radially outer, axially curved transitional portion U of the backplate 5, the respective air tapping means for cooling air (partial flow D3) from the upstream section of the annular duct 8 being provided by an annular slot 17 through which the needed cooling air, after clearing a nozzle-like constriction E, enters and travels through the annular cooling air duct 16 along a path indicated by the arrowheads. At its exit end, or its radially inner end, the cooling air duct 16 communicates with the radially outer air inlets of the ducts 13 of the second swirler 11. At the outlet end the cooling air, having served its cooling duty, is initially routed (see FIG. 1) through an axial duct 18 or conceivably through axially oriented flow passageways into an outer annulus 19 on the burner, said annulus 19 extending upstream of the backplate 5 (downstream with respect to cooling air flow) and communicating with all inlet ports of the ducts 13 of the second swirler 11. The annulus 19 is formed by a sleeve-like capping piece 20. In accordance with the embodiment depicted in FIG. 1A the capping piece 20', and hence the annulus 19', can be extended to points axially upstream of the backplate 5 (downstream with respect to cooling air flow) such that also the first swirler 10 (note the broken-line arrow) could be energized with a portion of the cooling air exiting from the cooling air duct 16 to be used as combustion air. In the latter case a relatively large cooling air volume could first be used for cooling, and then as primary air for combustion. In that case, to ensure the necessary cooling effectiveness and the necessary overall primary air requirement, care must be taken to design all inlet and flow sections of the convection cooling means to accommodate the relatively large volume of cooling air.

Figure 1A:
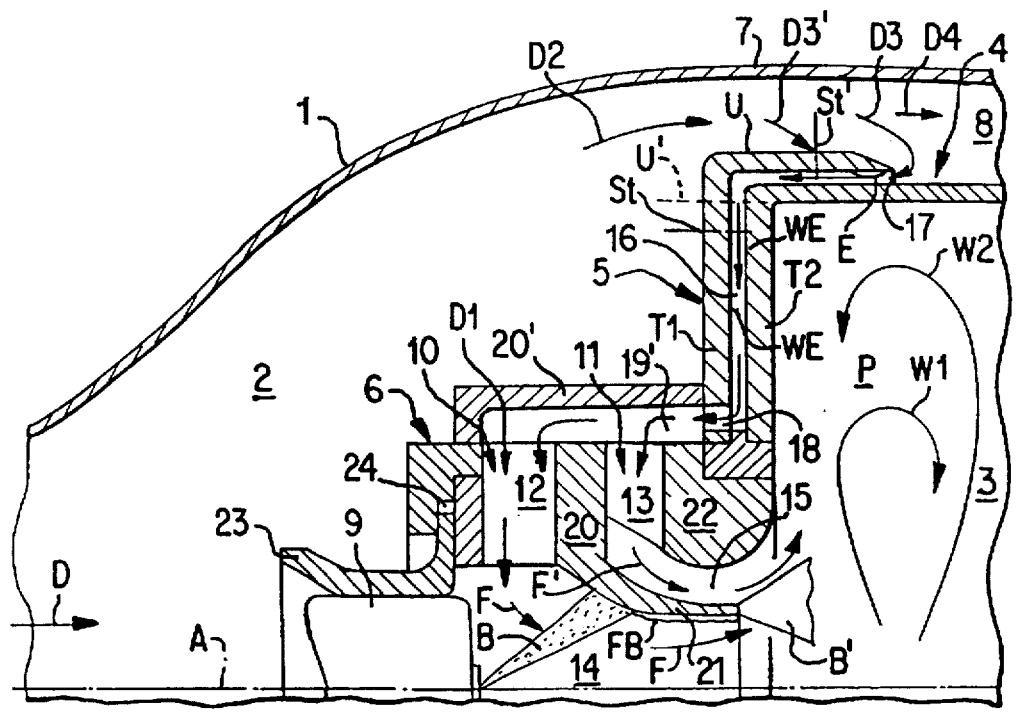
FIG. 1A is a view similar to FIG. 1, but showing an alternative embodiment.

FIG. 1A also schematically depicts the provision of connecting webs WE for connecting the wall members forming the backplate.

If the annular cooling air duct 16 in the backplate 5 of the flame tube 4 terminates at the approximate level of the radially outer circumferential plane U' (broken-line contour) an option exists, e.g., to provide axial passageways, drilled holes or slots at points St in the upstream wall member T1 of the backplate 5 to provide the cooling air duct 16 with a portion of the incoming compressed air D through the annulus 2.

Again with reference to FIG. 1 a partial air flow D3' can be diverted, in an alternative embodiment of the present invention, for cooling purposes at the upstream end of the annular duct 8 of the combustion chamber from the incoming compressed air D2 and ducted at points St' to the cooling air duct 16 through radial ports or drilled holes.

At the burner 6 the tangential ducts 12 and 13 of the first and second swirlers 10 and 11, respectively, are separated one from the other by a radial wall 20. Between the outlet ports of the ducts 12 and 13, respectively, the wall 20 internally continues in the form of a radially/axially curved sleeve 21. Downstream of the outlet ports of the ducts 12 of the first swirler 10 the sleeve 21 turns the wall of the cylindrical inner duct 14 into a Venturi tube, so that in the direction of flow, the wall of the inner duct 14 takes a convergent/divergent shape. Onto this wall formed by the sleeve 21, finely atomized fuel B is injected at an upstream point through the fuel nozzle 9 in the form of a flaring cone. Further downstream on this wall the injected atomized fuel deposits in the form of a film FB. At the extreme downstream edge of the sleeve 21 the fuel separates in accordance with B' in the path of a shear flow to be embedded and uniformly distributed in the form of mist and partially vapor in the vortexes W1, W2.

The annular duct 15 of the burner 6 is formed by portions of the wall 20 and outer circumferential surfaces of the sleeve 21 on the one hand and outlet-side circumferential sections of the second swirler 11 and convergent/divergent, radiused inner wall sections of an annular component 22 containing the ducts 13 on the other. The annular component 22 is used to secure the burner 6 to an inner ring of the backplate 5. The inner ring seals the cooling air duct 16 at a radially inner point relative to the burner 6 and here forms, e.g., an axially spaced-apart retainer for the two wall members T1 and T2. The fuel nozzle 9 is held in a supporting sleeve 23 which in turn is bound by its radial flange in a circumferential slot 24 at an upstream point in the housing of the burner 6.

Using essentially identical components and functions (combustion chamber, burner, fuel nozzle), FIG. 2 departs from FIG. 1 by providing impingement type of cooling for the backplate 5 of the combustion chamber. Cooling air for impingement cooling comes from an air portion D5 diverted from the compressed air D entering the annulus 2 of the combustion chamber at its head end. For the purpose, the upstream wall member T1 exhibits axial perforations—holes L—permitting high energy cooling air jets L' to impinge on the backplate's 5 downstream wall member T2 facing the combustion space 3. On the radially inner side around the burner 6, the spent cooling air continues out from the annular duct 16' and through the axial ducts 18 or drilled holes or slots into the radially outer annulus 19 at the burner 6 to serve in combustion in the primary zone P (FIG. 1). This feeds combustion air to the second swirler 11, which at its outlet end communicates with the combustion space 3, or the primary zone P through the annular duct 15 of the burner 6. In accordance with FIG. 1 the first swirler 10 in FIG. 2 can be provided with a portion D1 of the compressed air D entering the annulus 2 to serve in combustion. Also in an impingement cooling arrangement in accordance with FIG. 2 the annulus 19 as shown in FIG. 1 can axially be extended in an upstream direction such that the first and second swirlers 10 and 11 are supplied with the cooling air exiting from the impingement cooling arrangement to serve for combustion purposes.

Figure 3:
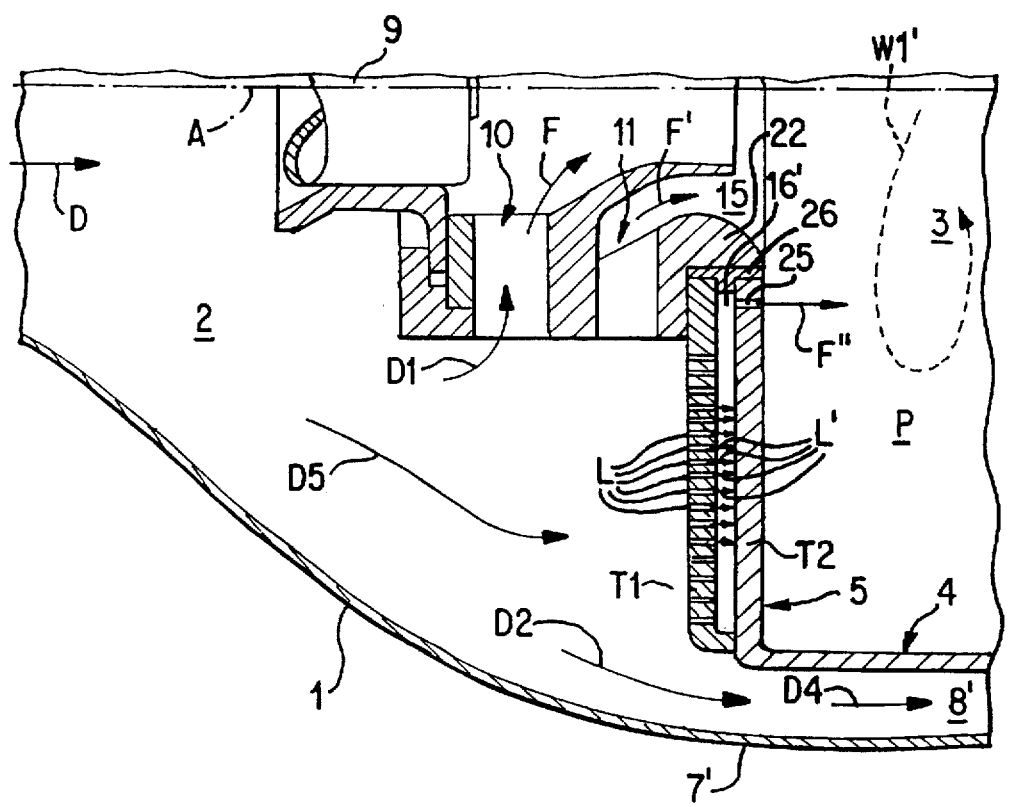
FIG. 3 is a view of another preferred embodiment of the invention, illustrating the lower half of a combustion chamber section with impingement-type cooling and with the cooling air exiting from the cooling system being used to augment the combustion air flow and at the burner is aimed axially into the vortex flow in the flame tube.

Using a practically identical impingement cooling arrangement for the backplate as shown in FIG. 2, FIG. 3 basically differs from FIGS. 1 and 2 in that the cooling air having cooled the backplate 5 of the flame tube 4—is routed in the direction of arrowhead F" to the combustion space 3 in the flame tube 4 through circumferentially equally spaced, axially oriented ports or holes 25 in the "mouth" of the burner to serve in combustion. From the holes 25 this portion of the combustion air F is axially expelled into the prevailing vortexes W1 and W2 such that the flame root, or the starting point of the flame section, is shifted axially downstream relative to the backplate 5. This again alleviates the heat load on the backplate 5 and parts of the burner 6. The holes 25 simultaneously achieve uniform, stable combustion in the primary zone P already at the flame root.

Figure 5:
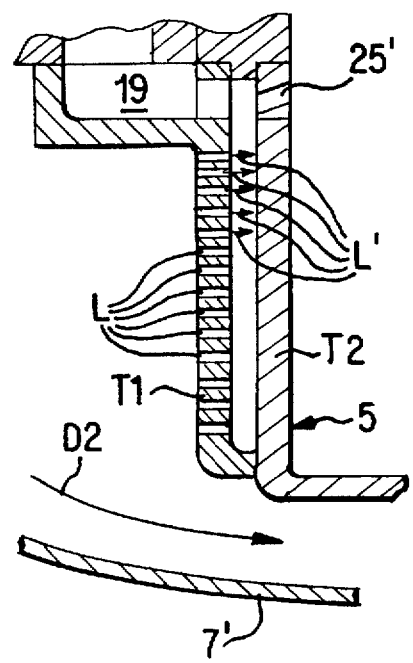
FIG. 5 is a schematic depiction showing inclined ports for forming independent swirl generators.

The use of the holes 25 or ports in the second wall member T2 is not restricted to the axial arrangement shown. In an arrangement inclined relative to the burner or nozzle centerline A and tangential across the circumference, e.g., the holes can form a vortex generator for the combustion air to be supplied. FIG. 5 schematically depicts such an inclined arrangement of the holes 25 in the second wall member T2.

In accordance with FIG. 3 the annulus 16' of the impingement cooling arrangement comprises the two wall members T1 and T2 of the backplate 5 plus a radially outer circumferential section of the annular component 22 of the burner 6. On the radially inner side, the annulus 16' is sealed by a spacer 26 between the two wall members T1 and T2. The burner 6 is here located at the backplate 5 through a radially/axially arranged recess in the annular component 22. Before the cooling air continues out from the axial holes 25 in the second wall member T2, therefore, it provides convection cooling for the burner "mouth" containing the holes 25 and for the annular component 22.

In the convection cooling arrangement of FIG. 1, e.g., the cooling air duct 16 between the two wall members T1 and T2 of the backplate 5 can be formed by circumferentially spaced chambers or ducts or cooling ducts. The cooling ducts can be formed by spacer webs WE (FIG. 1A) arranged on one of the two wall members T1 and T2. Depending on cooling requirements and locally available flow of cooling air, zones of larger heat transfer surfaces and/or zones of locally differing cooling air dwell times can be created. Locally enlarged heat transfer surfaces can be produced by, e.g., roughing the surface, by projections, webs or pimples on the cooling air-wetted inner surfaces, especially on the second (downstream) wall member T2. Depending on local accumulation and spacing, however, these means can also be used to affect and vary the local dwell times of the cooling air flow. For the latter purpose, flow baffles can be incorporated in the respective cooling air duct in the shape of spoiler plates.

With reference now to FIG. 2 the ports or holes 25 in the backplate 5 of the flame tube 4, as well as the flow ducts 13 of at least the second swirler 11, can be connected at their inlet ends to the outlet end of the cooling air duct 16'. For the purpose, use can be made of said ducts 18 and of the radially outer annulus 19 (FIG. 2).

This invention advantageously applies also to straight tubular combustion chambers and combined can-annular combustion chambers. In either case the generally cylindrical flame tube has a cap- or disk-shaped backplate on which to assemble a burner of the above description.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A gas turbine engine assembly comprising:
   a combustion chamber flame tube bounded on an upstream end thereof by a radially extending backplate;
   a burner mounted on the backplate and having a fuel nozzle and a burner air inlet with a first air swirler arranged on a common burner axis, and
   a cooling air duct formed by two parallel wall members of said backplate and extending radially through the backplate to cool said backplate during engine operation, said cooling air duct opening to said burner air inlet upstream of said first air swirler so that backplate cooling air passes through said cooling air duct parallel to said wall members and subsequently serves as combustion air supply through said burner air inlet and said first air swirler,
   wherein an outlet duct of said first air swirler is arranged to supply said combustion air to an edge of a wall on which fuel is deposited during operation to separate said fuel from said wall.

2. An assembly according to claim 1, wherein said combustion chamber flame tube and said backplate are annular and surround an engine axis,
   and wherein a plurality of said burners are provided which are distributed circumferentially spaced from one another around the flame tube backplate.

3. An assembly according to claim 2, wherein said two parallel wall members include first and second axially spaced radially extending wall members, said first wall member having one side facing the second wall member to form the cooling air duct between said first and second wall members and an oppositely facing side facing a pressurized air space supplied with pressurized air, said second wall member having a side facing away from the first wall member and forming a boundary of said flame tube.

4. An assembly according to claim 3, wherein the first wall member has axial perforations for cooling air jets impinging on the second wall member, said perforations communicating with the pressurized space.

5. An assembly according to claim 4, wherein the cooling air duct is divided into circumferentially distributed cooling air duct chambers.

6. An assembly according to claim 5, wherein the cooling air duct chambers are formed by spacer webs between the first and second wall members, the spacer webs being fixedly connected to the second wall member.

7. An assembly according to claim 6, wherein radial outer ends of said backplate extend axially and are provided with air bleed openings communicated with pressurized air from the pressurized air space, said air bleed openings being connected to the cooling air duct.

8. An assembly according to claim 7, wherein the air bleed openings are provided in the shape of circumferentially distributed ports.

9. An assembly according to claim 7, wherein said pressurized air space communicates with an annular duct defined by an outer casing surrounding the flame tube, said air bleed openings communicating with said annular duct.

10. An assembly according to claim 9, wherein the air bleed openings provide a nozzle-shaped throat at a point upstream of the cooling air duct.

11. An assembly according to claim 3, wherein the first wall member of the backplate has at least one axial duct at its radial inner end which communicates with the first swirler through an annulus, said annulus being formed by a sleeve-like capping part on the burner.

12. An assembly according to claim 1, wherein the wall on which fuel is deposited is on an annulus which forms a sleeve-like capping part on the burner, said fuel being deposited as a film axially and before it enters the combustion space.

13. An assembly according to claim 1, wherein said burner includes a second swirler axially spaced apart from the first swirler, tangential flow ducts of the swirlers being separated from one another by a wall which continues between respective outlet ports of the first and second swirlers in the shape of a radially and axially curved sleeve arranged on the burner coaxially with its center line.

14. An assembly according to claim 13, wherein said combustion chamber flame tube and said backplate are annular and surround an engine axis,
   and wherein a plurality of said burners are provided which are distributed circumferentially spaced from one another around the flame tube backplate.

15. An assembly according to claim 14, wherein the cooling air duct connects through an annulus to inlet 16. An assembly according to claim 13, wherein flow sections of the ducts of the first swirler are variable by means of axially slidable members extending into the ducts.

17. An assembly according to claim 1, wherein a downstream portion of the cooling air duct directly communicates with a primary zone in the combustion space through circumferentially equally distributed ports in the backplate.

18. An assembly according to claim 17, wherein a downstream portion of the cooling air duct is supplied with preheated cooling air from a clam shell impingement cooling arrangement on the backplate, which cooling air serves as primary combustion air.

19. An assembly according to claim 18, wherein a downstream part of the cooling air duct projects into a recess in an annular transitional piece of the burner, and wherein ports are arranged in a wall member of the backplate on the burner which locally directly delimits the combustion space.

20. An assembly according to claim 19, wherein the ports form an independent swirl generator for the combustion air to be supplied to a primary combustion zone in the flame tube.

21. An assembly according to claim 20, wherein inlet ends of both the ports in the backplate and the flow ducts of at least the first swirler connect to an outlet end of the cooling air duct.

22. An assembly according to claim 1, wherein said burner includes an annular cup shaped part which surrounds said burner air inlet, an axially open end of said annular cup connecting directly to an annular space on the backplate which connects with a radially inner end of the cooling air duct through the backplate.

23. An assembly according to claim 22, wherein said combustion chamber flame tube and said backplate are annular and surround an engine axis, and wherein a plurality of said burners are provided which are distributed circumferentially spaced from one another around the flame tube backplate.

* * * * *

UNITED STATES PATENT AND TRADEMARK OFFICE
CERTIFICATE OF CORRECTION

PATENT NO. : 5,765,376
DATED : June 16, 1998
INVENTOR(S) : Nikolaos Zarzalis, Gunter Meikis It is certified that error appears in the above-indentified patent and that said Letters Patent is hereby corrected as shown below:

In Claim 15, line 2, change "inlet" to

-- an inlet end of said second swirler --

Signed and Sealed this

First Day of September, 1998

Attest:

BRUCE LEHMAN

*Attesting Officer*  *Commissioner of Patents and Trademarks*